United States Patent
Cavallini et al.

(10) Patent No.: US 12,496,759 B2
(45) Date of Patent: Dec. 16, 2025

(54) COOLING DEVICE FOR A PLURALITY OF PREFORMS OR TUBULAR CONTAINERS

(71) Applicant: S.I.P.A. SOCIETÀ INDUSTRIALIZZAZIONE PROGETTAZIONE E AUTOMAZIONE S.P.A., Vittorio Veneto (IT)

(72) Inventors: Franco Cavallini, Treviso (IT); Marco Frare, San Fior (IT); Andrea Mariani, Conegliano (IT); Marco Piai, Sacile (IT); Matteo Zoppas, Conegliano (IT)

(73) Assignee: S.I.P.A. SOCIETÀ DI INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 83 days.

(21) Appl. No.: 18/282,392

(22) PCT Filed: Mar. 17, 2022

(86) PCT No.: PCT/IB2022/052441
§ 371 (c)(1),
(2) Date: Sep. 15, 2023

(87) PCT Pub. No.: WO2022/195534
PCT Pub. Date: Sep. 22, 2022

(65) Prior Publication Data
US 2024/0157616 A1 May 16, 2024

(30) Foreign Application Priority Data
Mar. 18, 2021 (IT) ........................ 102021000006479

(51) Int. Cl.
*B29C 45/73* (2006.01)
*B29C 45/16* (2006.01)

(52) U.S. Cl.
CPC ...... *B29C 45/7312* (2013.01); *B29C 45/1625* (2013.01); *B29C 2045/1626* (2013.01)

(58) Field of Classification Search
CPC ............ B29C 45/7312; B29C 45/1618; B29C 2045/1626
See application file for complete search history.

(56) References Cited

U.S. PATENT DOCUMENTS

| 6,299,431 B1 * | 10/2001 | Neter | ................... B29C 45/7207 |
| | | | 425/576 |
| 2008/0256789 A1 * | 10/2008 | Fisch | ..................... B29C 45/42 |
| | | | 425/351 |

FOREIGN PATENT DOCUMENTS

WO 2020118413 A1 6/2020

OTHER PUBLICATIONS

International Search Report for PCT/IB2022/052441, dated Jul. 15, 2022.

* cited by examiner

*Primary Examiner* — Jacob T Minskey
*Assistant Examiner* — Virak Nguon
(74) *Attorney, Agent, or Firm* — Troutman Pepper Locke LLP

(57) ABSTRACT

A cooling device for cooling a plurality of preforms or tubular containers, preferably exiting from a rotary injection molding apparatus, the device comprising—a first longitudinal support member (7) defining a longitudinal axis Y and having a first longitudinal surface (2) and a second longitudinal surface (3) opposite to the first longitudinal surface; —a plurality of cooling tubes (4), each adapted to receive a respective preform to be cooled, said cooling tubes being (Continued)

arranged on said first longitudinal surface (2) in sequence along the longitudinal axis Y and each cooling tube defining a perpendicular axis thereof with respect to said longitudinal axis Y; —at least one first connection pin (5) protruding from said second longitudinal surface (3) for a quick coupling to a second longitudinal support member (14), preferably adapted to be arranged on a rotary cooling apparatus.

20 Claims, 14 Drawing Sheets

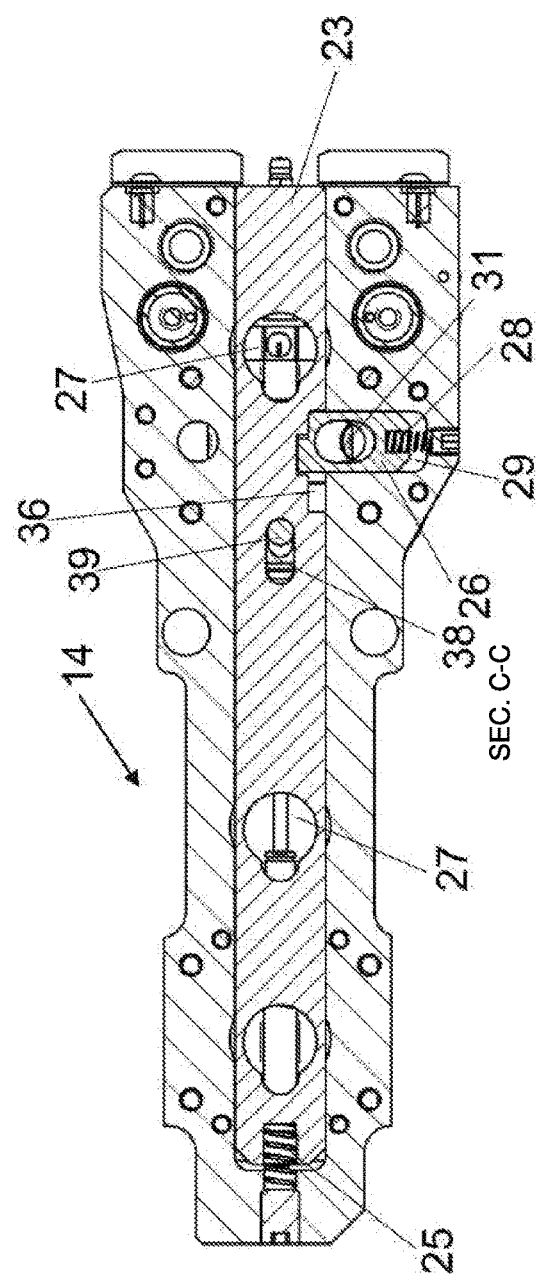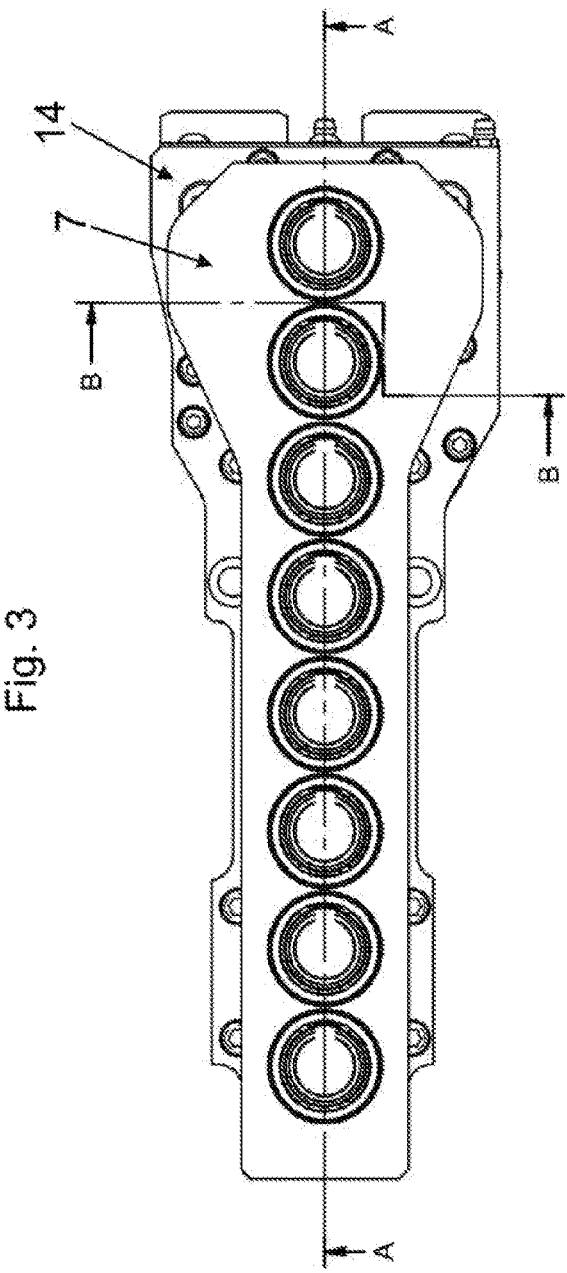

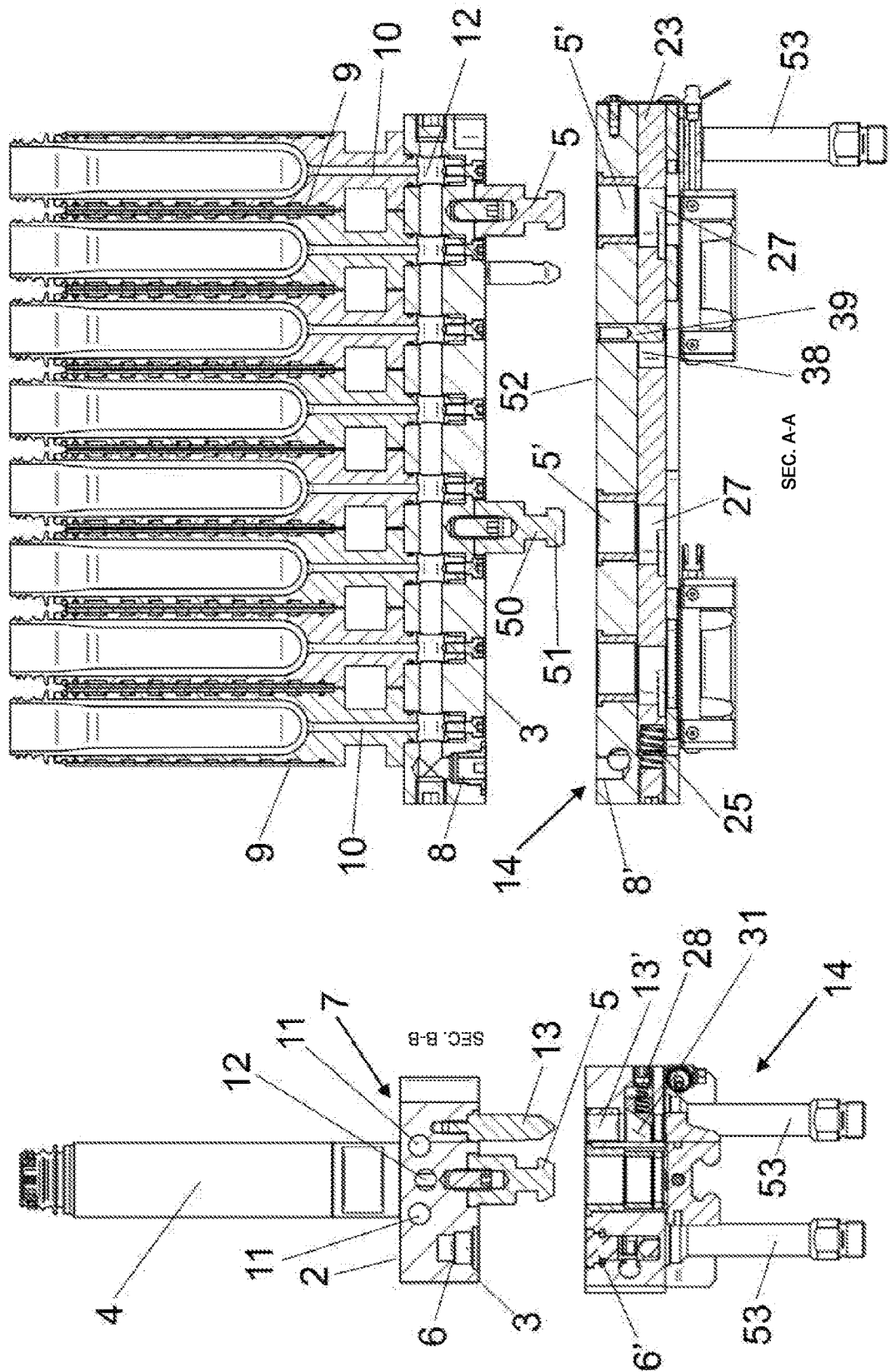

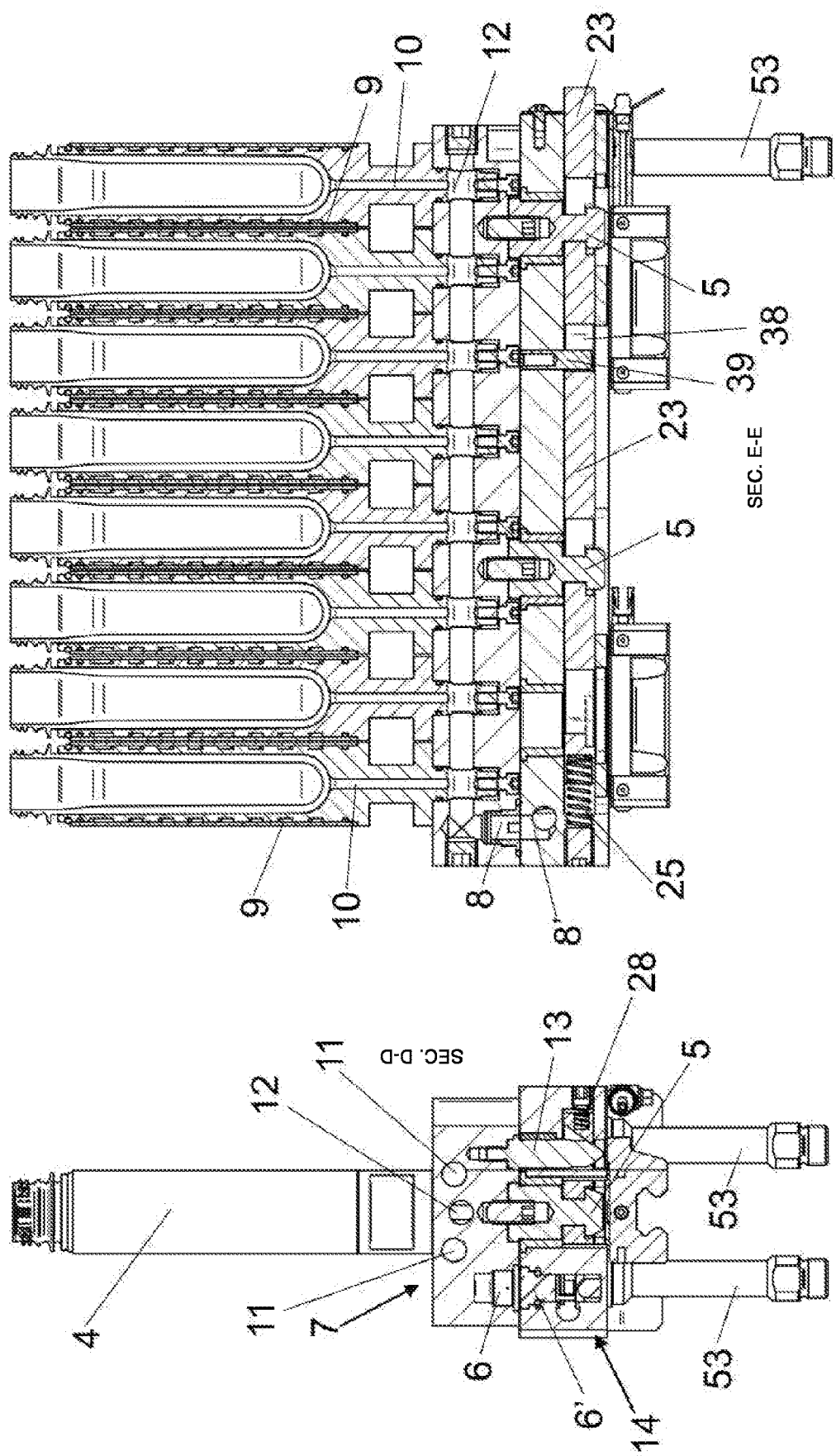

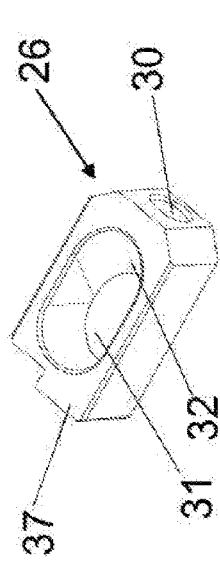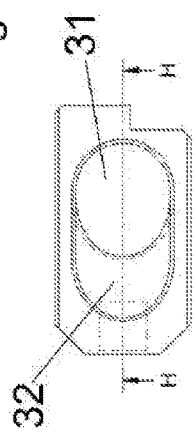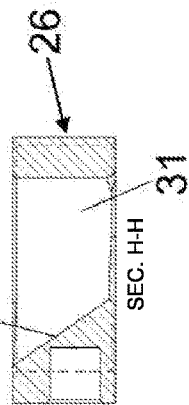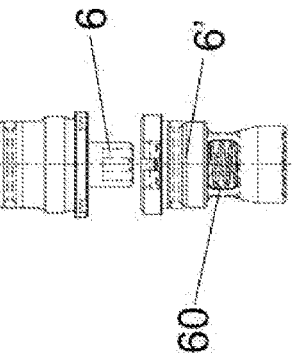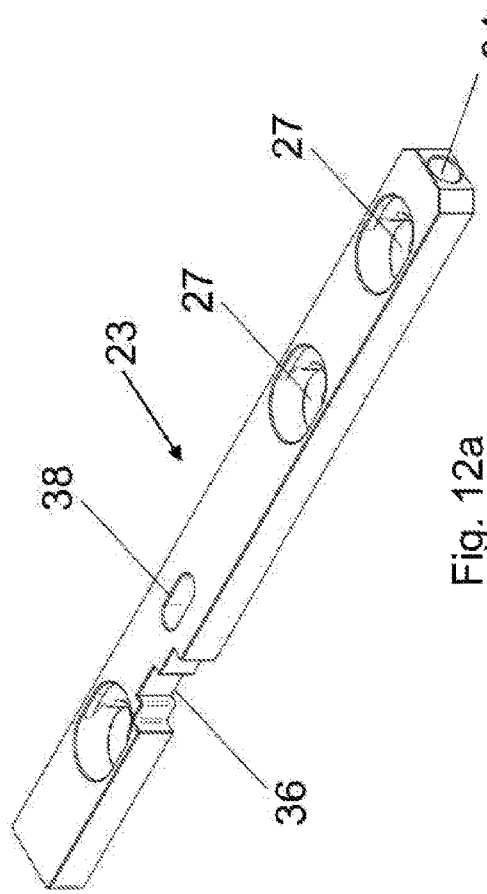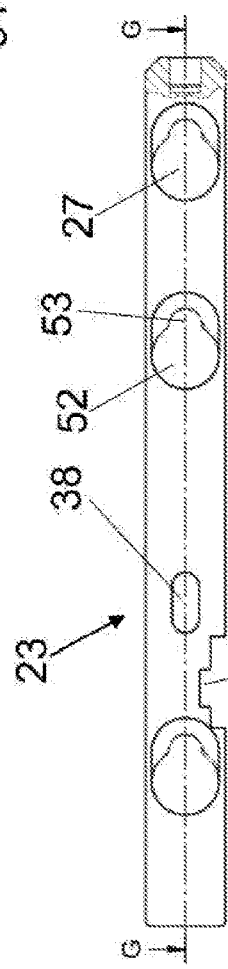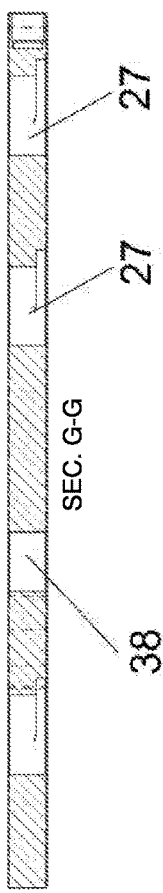

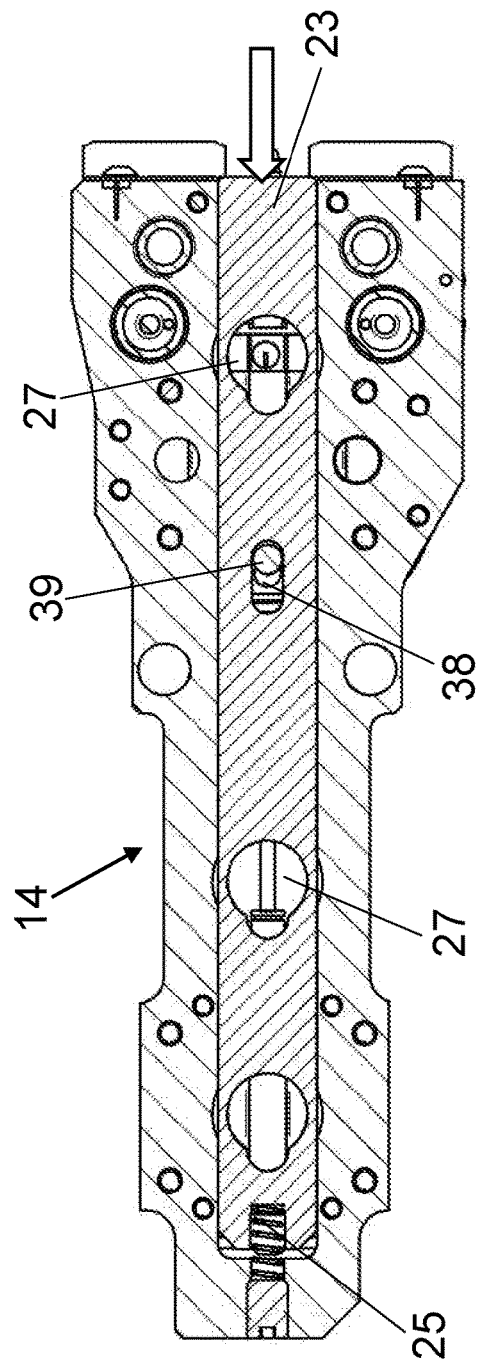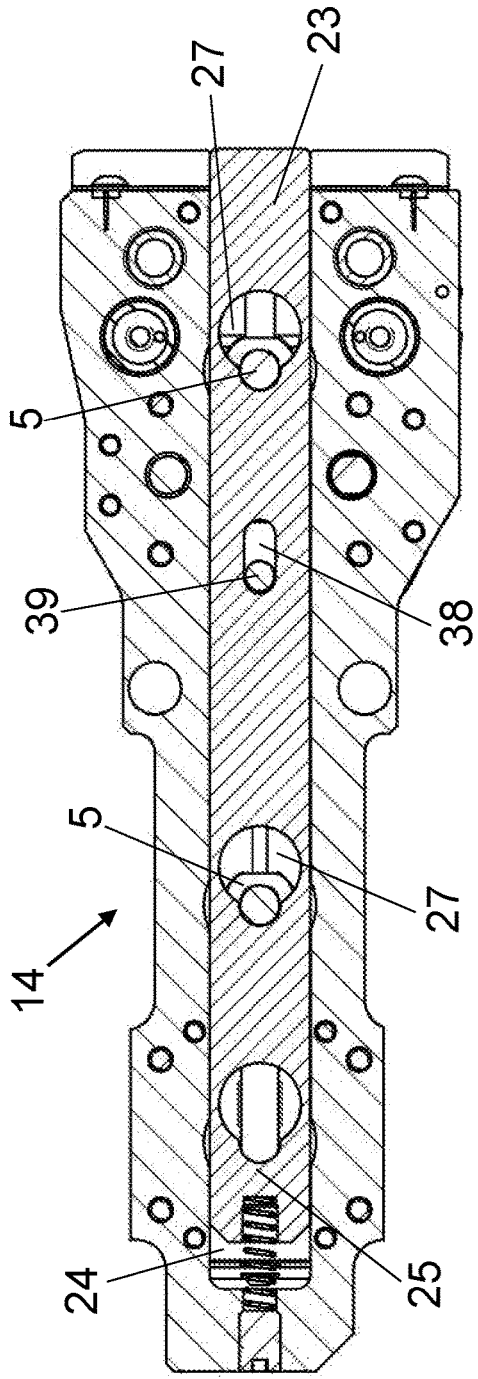
Fig. 15a
Fig. 15b

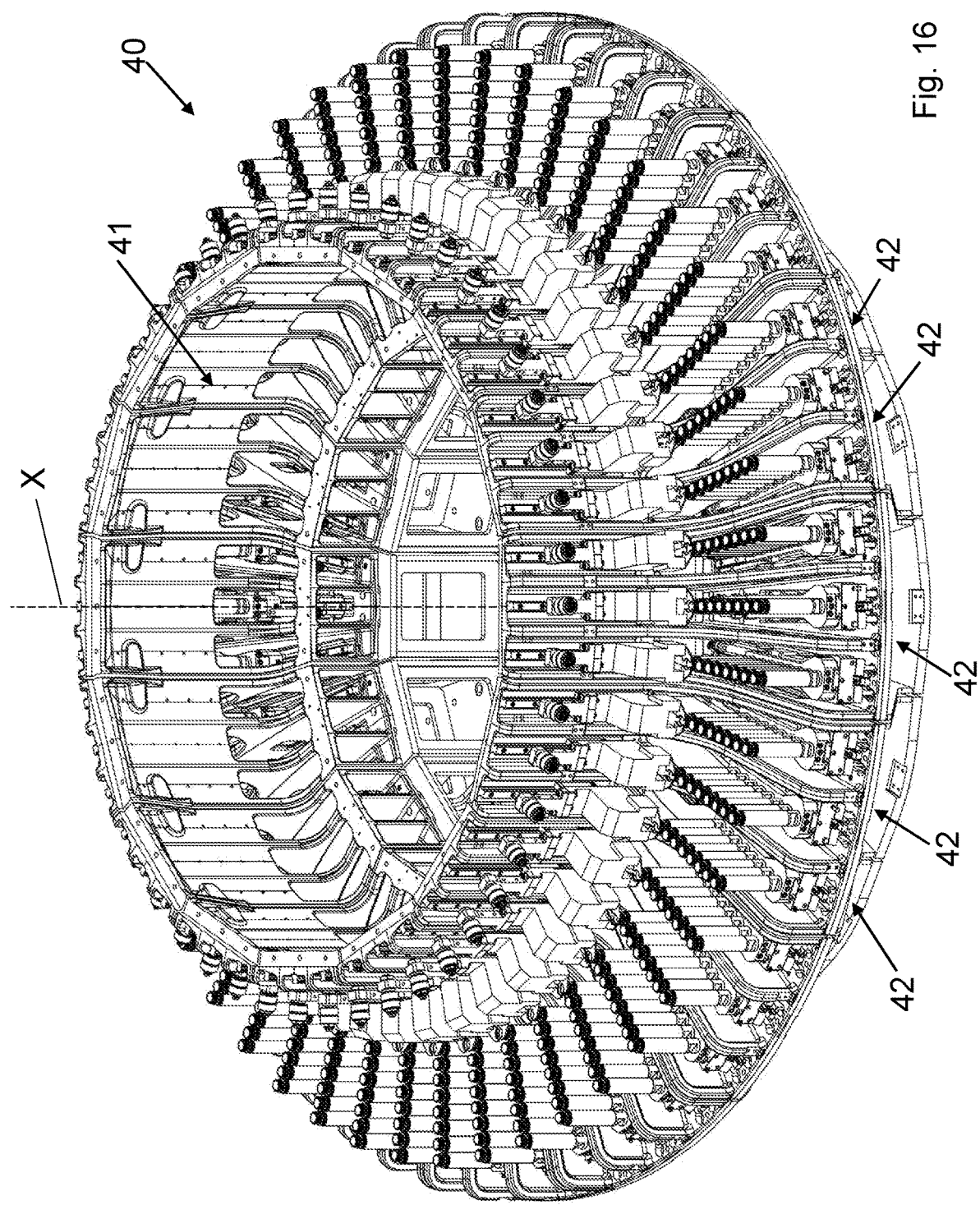

COOLING DEVICE FOR A PLURALITY OF PREFORMS OR TUBULAR CONTAINERS

This application is a national stage application under 35 U.S.C. § 371 from PCT Application No. PCT/IB2022/052441, filed Mar. 17, 2022, which claims the priority benefit of Italian Application No. 102021000006479, filed Mar. 18, 2021, which is incorporated by reference herein in its entirety.

FIELD OF THE INVENTION

The present invention relates to a cooling device for cooling a plurality of preforms or tubular containers, in particular usable in a rotary cooling apparatus.

BACKGROUND ART

The production of a significant number of containers made of thermoplastics, in particular bottles, is a process which, starting from the raw material, generally polyethylene terephthalate or PET, allows obtaining finished containers having a shape—even a particularly complex one—adapted to the most varied needs of the market and being particularly lightweight and also resistant when subjected to strong pressures at room temperature.

The passage from PET in the raw state in the form of granules to plastic container can be achieved by choosing either a single-stage process or a two-stage process. The single-stage process is performed with a single production plant in which the passage from PET granules to preform, by means of a mold injection step, and the passage from preform to plastic container, by means of the stretch-blowing step, continuously occurs without letting the preform completely cool to room temperature. Thereby, the preform still maintains part of the latent heat remaining from the injection step, with significant energy saving, because the preforms require less heat to then be brought back to the suitable temperature for blowing with respect to when they are to be reheated from room temperature.

Instead, a so-called "two-stage" process is performed in two plants which are generally, but not necessarily, separate: one production plant performs the first part of the container production process with the passage from PET granules to preform, i.e., it carries out the step of injecting the PET preforms into injection molds. The second part of the process, which transforms the preform into the final container into a blower with the stretch-blowing technique, generally used today to blow PET containers, is performed in the other production plant. The two-stage process may also be performed in the same production plant, which includes injecting preforms and blowing them into containers, but the two operations are performed at two separate times. The preforms are first cooled in special cooling plants until reaching room temperature, to then be stored while waiting to be introduced into appropriate furnaces to bring them back to the temperature required to perform the blowing process typical of the thermoplastics used or required for the stretch-blowing, if PET is used.

So-called stars comprising a rotatable wheel provided with a series of grippers having extendible arms equipped with jaws may be employed for transporting the preforms or containers formed in plants consisting of rotary carousels for injection molding or consisting of linear molding machines. Certain problems concerning this type of production plant for producing PET preforms or containers relate to the need to provide increased automation capability, increased reliability, an increase in the transfer speed of the preforms from one station to the other, a decrease in maintenance times, and above all a decrease in production times.

For example, for cooling a plurality of preforms or tubular containers at the outlet of an injection molding machine it is known to use plates provided with a rectangular array of cooling tubes.

Disadvantageously, in case of a format change of a preform or tubular container to be cooled, the support plate of the cooling tube array, having significant size and weight, must be disassembled and replaced with a new support plate for receiving the new format. Furthermore, after the installation of the new support plate, an operation for adjusting the alignment and centering of the tubes is generally required. These operations take significant time, thus reducing the productivity of the plant.

SUMMARY OF THE INVENTION

It is the object of the present invention to provide a cooling device for cooling a plurality of preforms or tubular containers, preferably at the outlet from a rotary or linear injection molding apparatus, which allows a quick replacement of the cooling tubes in case of a format change of the preforms to be cooled.

It is a further object of the invention to provide a cooling device which is light and compact.

It is another object of the invention to provide a cooling device which, being preferably provided with a single row of cooling tubes arranged so as to be centered along an axis, does not require, after its quick coupling to a support member, the classic operation of adjusting the alignment and centering of the tubes that is instead provided in prior art solutions.

The solution of the invention is a cooling device comprising
  a first longitudinal support member defining a longitudinal axis Y and having a first longitudinal surface and a second longitudinal surface opposite to the first longitudinal surface;
  a plurality of cooling tubes, each adapted to receive a respective preform to be cooled, said cooling tubes being arranged on said first longitudinal surface in sequence along the longitudinal axis Y and each cooling tube defining a perpendicular axis thereof with respect to said longitudinal axis Y;
  and at least one first connection pin protruding from said second longitudinal surface for a quick coupling to a second longitudinal support member, preferably adapted to be arranged on a rotary cooling apparatus.

Another aspect of the invention provides for a cooling system for cooling a plurality of preforms or tubular containers, preferably exiting from a rotary injection molding apparatus, the system comprising
  the aforesaid cooling device and a second longitudinal support member arranged along said longitudinal axis Y,
  wherein said first longitudinal support member and said second longitudinal support member are connectable to each other by a quick coupling system,
  wherein said quick coupling system comprises said at least one first connection pin, and preferably comprises, inside said second longitudinal support member, a first slider provided with at least one hole or cavity for locking said at least one first connection pin therein, wherein said first slider, defining a first longitudinal sliding direction, is able to slide along said first direction on a plane parallel to said longitudinal axis Y and is able to take an unlocking position, in which it is possible to unlock the first longitudinal support member from the second longitudinal support member, and a locking position, in which the at least one first connection pin is locked inside the at least one hole or cavity.

Advantageously, this cooling system allows an easy, quick and effective replacement of the cooling tubes when changing the format of the preforms to be cooled.

In a variant, the quick coupling system also comprises, inside said second longitudinal support member, a second slider defining a second longitudinal sliding direction on said plane, intersecting said first sliding direction; said second slider being able to slide along said second sliding direction from a first position of mechanical connection with the first slider, in which the first slider is in the unlocking position, to a second position of release from said first slider, in which the first slider is in the locking position.

A further aspect of the invention relates to a rotary cooling apparatus for cooling preforms or tubular containers made of thermoplastic material, comprising:
- a carousel having a periphery thereof and adapted to rotate about a substantially vertical rotation axis X;
- at least one fixed guide element arranged along at least part of said periphery;
- a plurality of cooling systems, such as that indicated above, arranged radially along the periphery of the carousel, each cooling system being adapted to translate substantially horizontally along a radial direction with respect to said rotation axis X and provided with a plurality of cooling tubes arranged in sequence along said radial direction and each adapted to receive a respective preform to be cooled;
- a plurality of picking and releasing devices, each picking and releasing device cooperating with a respective cooling system and being adapted to pick a preform from a transfer wheel placed upstream of said rotary cooling apparatus, release said preform alternately into one of said cooling tubes and pick said preform again to release it downstream of said rotary cooling apparatus, said at least one picking and releasing device being adapted to translate upwards or downwards transversally to said radial direction by cooperating with said at least one fixed guide element, during a rotation of the carousel.

Advantageously, such a rotary cooling apparatus is highly compact and reliable, has a greater automation capacity and allows reducing the cooling times of the preforms or test tubes, while still making them sufficiently solid on the outside to be able to be hooked without any risk of deformation.

The dependent claims describe preferred embodiments of the invention, forming an integral part of the present description.

BRIEF DESCRIPTION OF THE DRAWINGS

Further features and advantages of the invention will become more apparent in light of a detailed description of preferred, but not exclusive, embodiments of a cooling system for cooling a plurality of preforms, disclosed by way of non-limiting example, with the aid of the accompanying drawings, in which:

FIG. 2c depicts a top view of the components shown in FIG. 2a;

FIG. 3 depicts a sectional view of a component in FIG. 2b along the plane C-C;

FIG. 4 depicts a sectional view of the components in FIG. 2c along the plane B-B;

FIG. 5 depicts a sectional view of the components in FIG. 2c along the plane A-A;

FIG. 6c depicts a top view of the components shown in FIG. 6a;

FIG. 8 depicts a sectional view of the components in FIG. 6c along the plane D-D;

FIG. 9 depicts a sectional view of the components in FIG. 6c along the plane E-E;

FIG. 10 depicts a top view of the components shown in FIG. 6a;

FIGS. 12a-12c depict views of a first slider provided in one of said components;

FIGS. 13a-13c depict views of a second slider provided in one of said components;

FIG. 14 depicts a side view of a further component of the system of the invention;

FIGS. 15a and 15b depict a sectional view of a component of a further embodiment of the cooling system according to the invention, in a first operating position and in a second operating position, respectively;

FIG. 16 depicts a perspective view of a rotary cooling apparatus comprising a plurality of cooling systems;

The same reference numbers in the figures identify the same elements or components.

DETAILED DESCRIPTION OF PREFERRED EMBODIMENTS OF THE INVENTION

In order to cool a plurality of preforms or tubular containers, the cooling device, according to the present invention, can be installed for example on a rotary cooling apparatus 40, such as that shown in FIG. 16.

Figure 18:
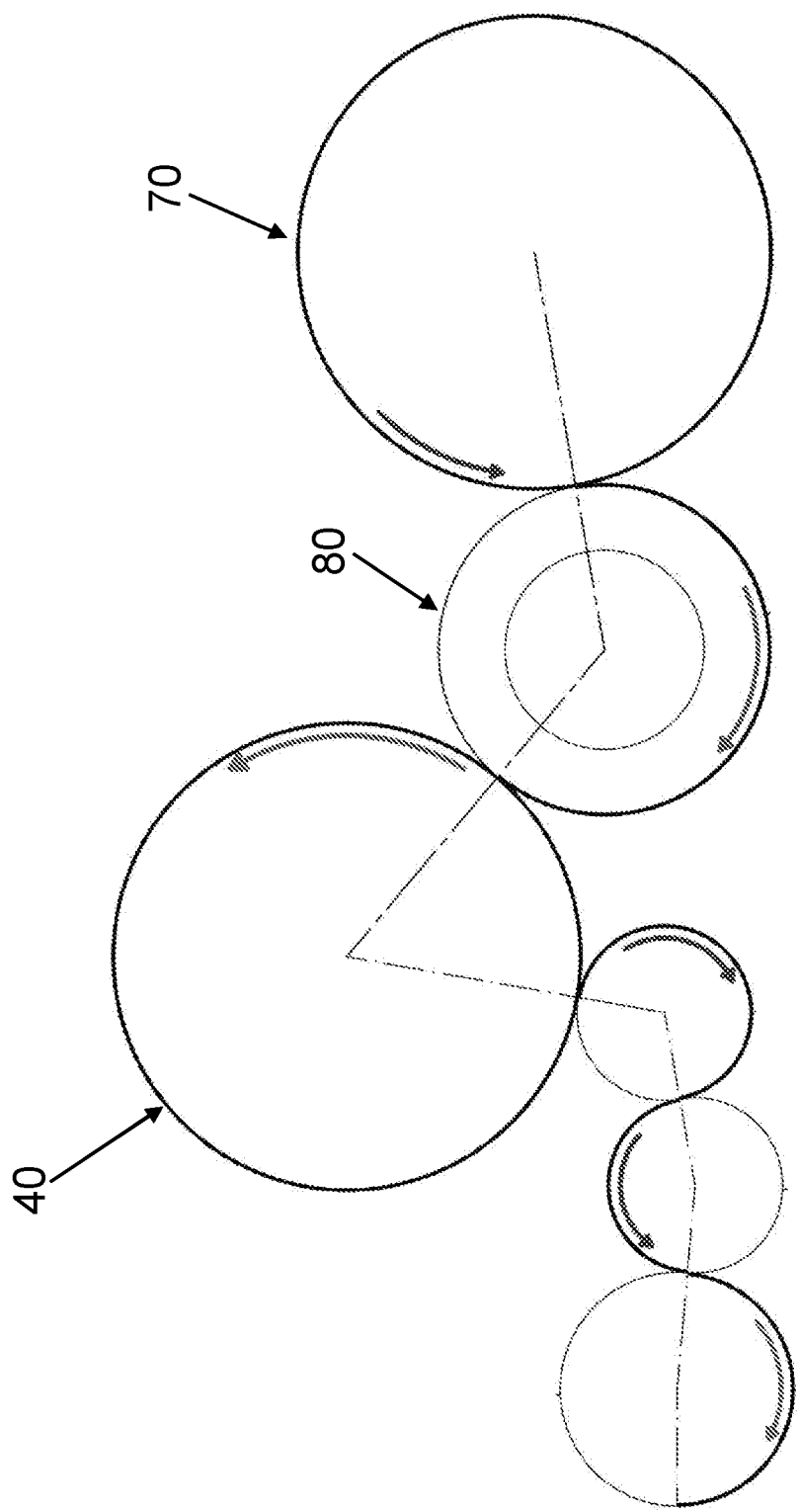
FIG. 18 depicts a diagrammatic plan view of an example of production plant for producing preforms or containers made of thermoplastics in which the apparatus in FIG. 16 is incorporated.

Such a rotary cooling apparatus 40 for cooling preforms or tubular containers, such as test tubes, made of thermoplastic material, is adapted to be arranged, in a production plant for producing preforms or containers, downstream of a rotary injection molding machine 70, for example, but not necessarily, a rotary injection-compression molding machine (FIG. 18). Alternatively, such a rotary cooling apparatus 40 is adapted to be arranged, in a production plant for producing preforms or containers, downstream of a non-rotary injection molding machine, such as a linear injection molding machine.

A transfer wheel 80 is provided between the rotary, or linear, injection molding machine 70 and the rotary cooling apparatus 40. Any technical solution for unloading the cooled preforms or containers can be provided downstream of the rotary cooling apparatus 40.

Figure 17:
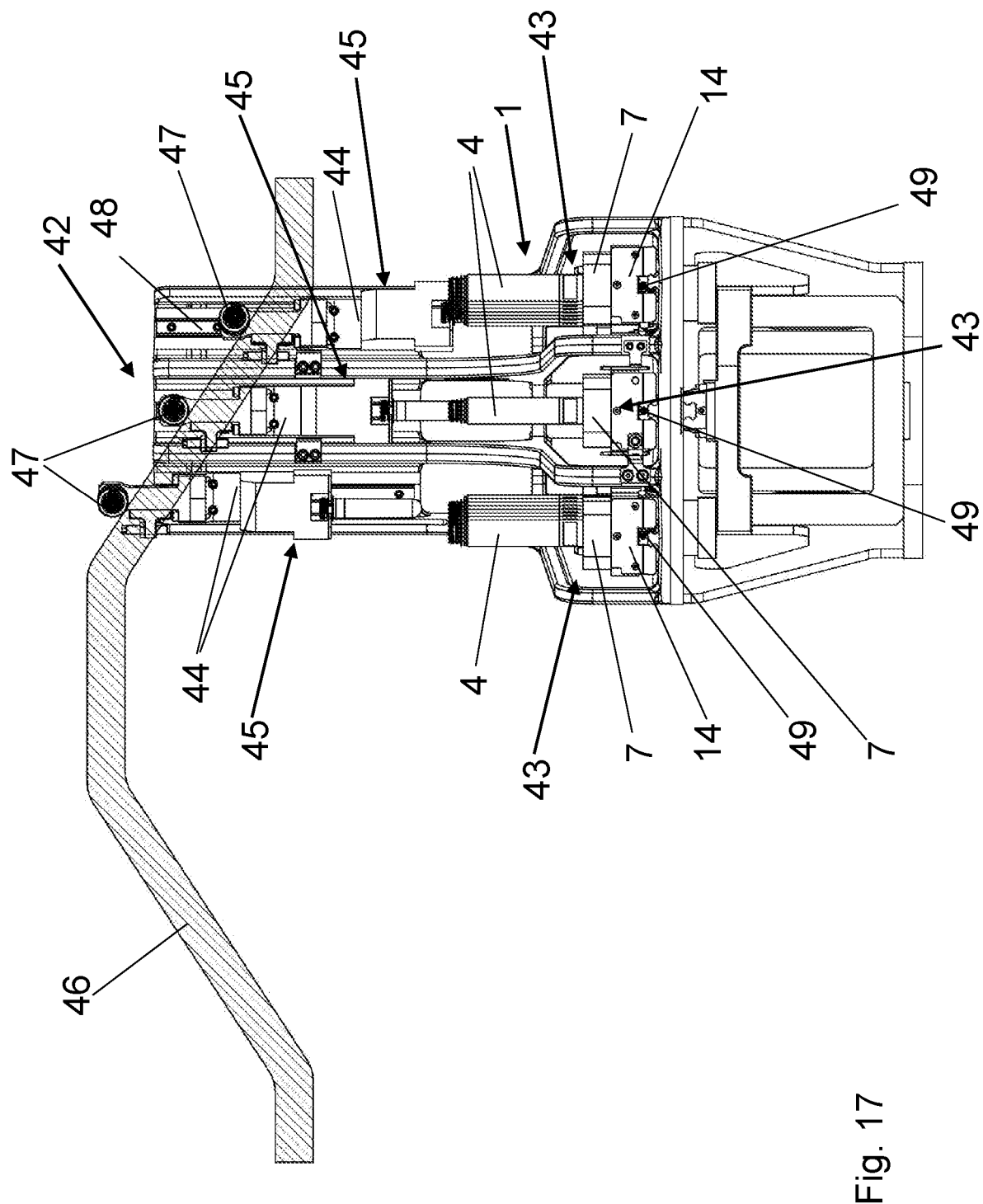
FIG. 17 depicts a front view of a module of the apparatus in FIG. 16 and part of a guide element for adjusting the height of the picking and releasing devices.

The rotary cooling apparatus 40 comprises (FIGS. 16-17):
- a carousel 41 defining a circular periphery thereof and adapted to rotate about a substantially vertical rotation axis X;
- at least one fixed guide element 46, for example only one guide element or cam, which is only partially shown FIG. 17, arranged along at least part of the periphery of the carousel 41;
- a plurality of cooling systems 43 radially arranged along the periphery of the carousel, each cooling system 43 being adapted to substantially horizontally translate along a radial direction with respect to the rotation axis X, and provided with a plurality of cooling tubes 4 arranged parallel to one other and in sequence along the radial direction and adapted to each receive a respective preform to be cooled;
- a plurality of picking and releasing devices 45, each picking and releasing device 45 cooperating with a respective cooling system 43 and being adapted to pick a preform from the transfer wheel 80, release said preform alternately into one of said cooling tubes 4 and pick the same preform again, once cooling is complete, to release it downstream of the rotary cooling apparatus 40, for example at one or more unloading wheels.

In particular, the guide element 46 can be a continuous or non-continuous annular element, i.e., an annular element which is closed or open in a portion thereof, concentric to the carousel 41, and provided with areas at different heights.

The at least one picking and releasing device 45 is adapted to translate upwards or downwards transversely to the radial direction, for example perpendicularly to the radial direction, by means of a cooperation with the fixed guide element 46 during the rotation of the carousel 41.

For example, each picking and releasing device 45 comprises a support structure 44 sliding along a substantially vertical guide 48, fixed to the structure of the carousel. Such a support structure 44 is provided, preferably at the upper end thereof, with a roller or tappet element 47 which, during the rotation of the carousel 41, by sliding or following the guide element 46, causes the upwards or downwards translation of the corresponding picking and releasing device 45. The support structure 44 is instead provided, preferably at the lower end thereof, with grippers.

Optionally, at least one cooling system 43 and at least one corresponding picking and releasing device 45 are arranged in, and thus define, a cooling module 42 of the rotary cooling apparatus 40.

In case of the presence of the cooling modules 42, at least one guide 48 is fixed onto each cooling module.

In the example in FIG. 17, the cooling module 42 comprises three cooling systems 43 and three corresponding picking and releasing devices 45.

Other variants can be provided with less than three or more than three cooling systems 43, and respective picking and releasing devices 45, for each cooling module 42. A single cooling system 43 and a single corresponding picking and releasing device 45 may for example be provided.

At least one movement device is provided (not shown), for example at least one motor with related drive, adapted to impart to a corresponding cooling system 43 the translation motion along the radial direction Y, in a first direction or in a second direction opposite to the first direction, preferably but not necessarily equal to the pitch between one cooling tube and the one adjacent thereto.

Each cooling system 43 comprises a cooling device 1 according to the invention.

Figure 1B:
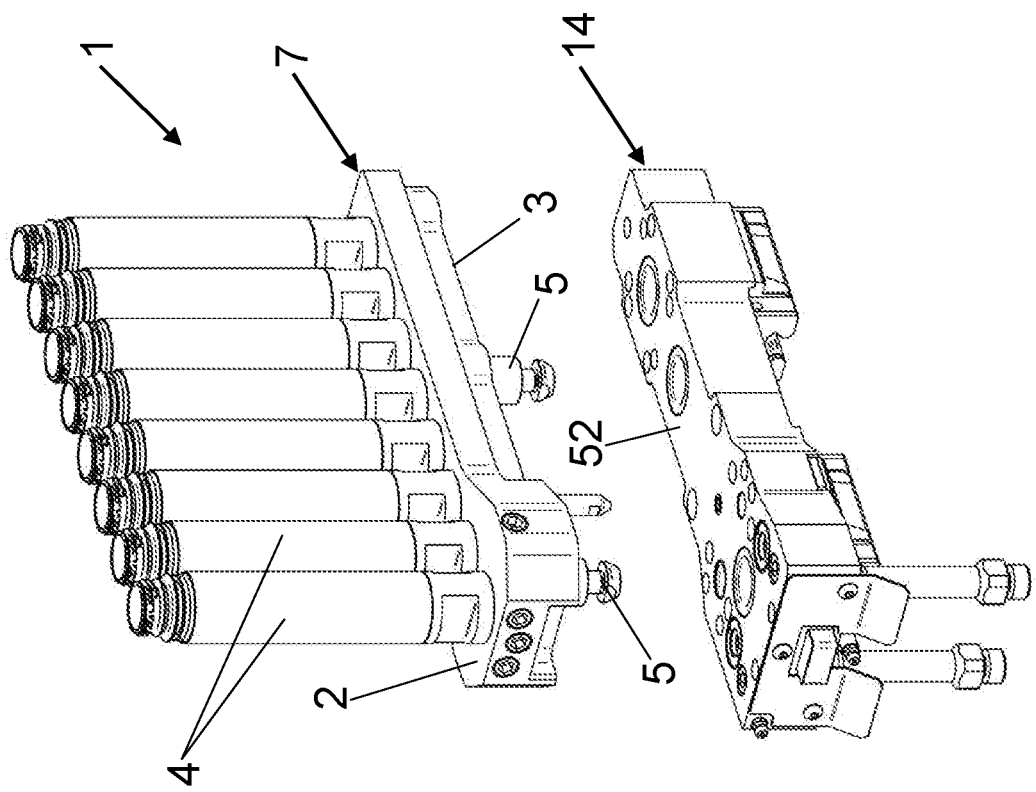
FIG. 1b depicts a perspective view of components of the system in FIG. 1a not coupled to one another.
Figure 1A:
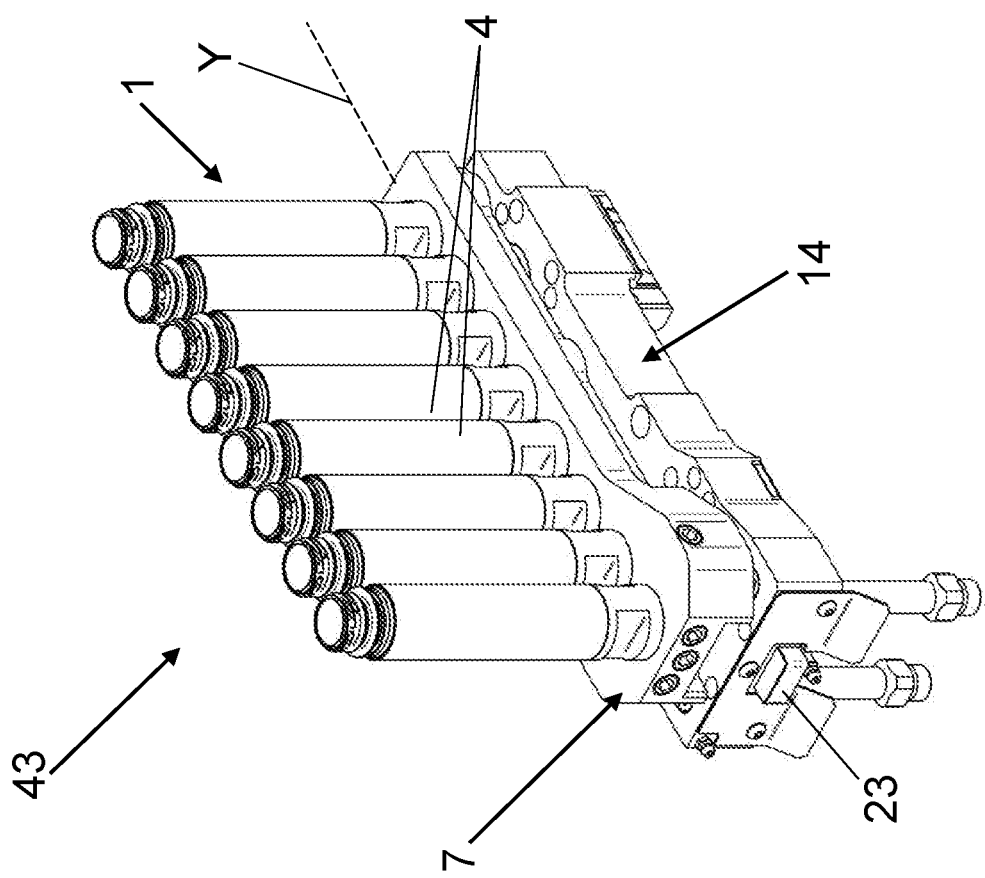
FIG. 1a depicts a perspective view of an example of a cooling system according to the invention.

Such a cooling device 1 comprises (FIGS. 1b, 1c):
- a first longitudinal support member 7 defining the longitudinal axis Y and having a first longitudinal surface 2 and a second longitudinal surface 3 opposite to the first longitudinal surface 2;
- a plurality of cooling tubes 4, each adapted to receive a respective preform to be cooled, said cooling tubes being arranged on the first longitudinal surface 2 in sequence along the longitudinal axis Y and each cooling tube defining a perpendicular axis thereof with respect to the longitudinal axis Y;
- at least one first connection pin 5 protruding from the second longitudinal surface 3 for a quick coupling to a base or second longitudinal support member 14, that is part of said cooling system 43 and preferably arranged on a structure of the rotary cooling apparatus 40.

Preferably, the at least one first connection pin 5 has a substantially mushroom- or cap-shaped end. More generally, such an end is provided with a first portion 50, proximal to the second longitudinal surface 3 and having a first diameter, and with a second portion 51, distal from the second longitudinal surface and having a second diameter which is larger than the first diameter (FIG. 5).

Optionally, at least one second connection pin 13 is provided, preferably a tapered pin, protruding from the second longitudinal surface 3 for a quick coupling to the second longitudinal support member 14.

In particular, the second longitudinal support member 14, arranged along the longitudinal axis Y, can slide on a guide or rail 49, in turn integrally fixed to said structure, preferably to the structure of a cooling module 42 (FIG. 17).

The first support member 7 and the second support member or base 14 can be made of a metal material, preferably but not necessarily aluminum.

Preferably, the cooling tubes 4 of the cooling device 1 are arranged in a single row, preferably each adjacent to the next one, along the longitudinal axis Y.

In one variant, on the second surface 3 of the first longitudinal support member 7 the are provided (FIG. 1c):
- at least one first male or female fluid-tight connection member 6, adapted to be coupled to a corresponding first female or male member 6' engaged in the second longitudinal support member 14 (FIGS. 4, 8), for the passage of a cooling fluid, for example water, from the second longitudinal support member 14 to the first longitudinal support member 7, and vice versa;
- at least one second male or female fluid-tight connection member 8, adapted to be coupled to a corresponding second female or male member 8' engaged in the second longitudinal support member 14, (FIGS. 5, 9), for the passage of air from the first longitudinal support member 7 to the second longitudinal support member 14, and vice versa.

Each cooling tube 4 is preferably provided with an internal circuit 9 (FIGS. 5 and 9) for the cooling fluid and with an air suction duct 10 to facilitate the introduction of the preform into the cooling tube, for example when released by the picking and releasing device 45 of the rotary cooling apparatus 40.

The first longitudinal support member 7 is preferably provided with:
- at least one channel 11 for the cooling fluid, connected on one side to the at least one first male or female member 6 and on the other side to the internal circuit 9 of each cooling tube 4 (FIGS. 4 and 8),
- and at least one further channel 12 for the air, connected on one side to the at least one second male or female member 8 and on another side to the suction duct 10 of each cooling tube 4 (FIGS. 5 and 9).

Figure 1C:
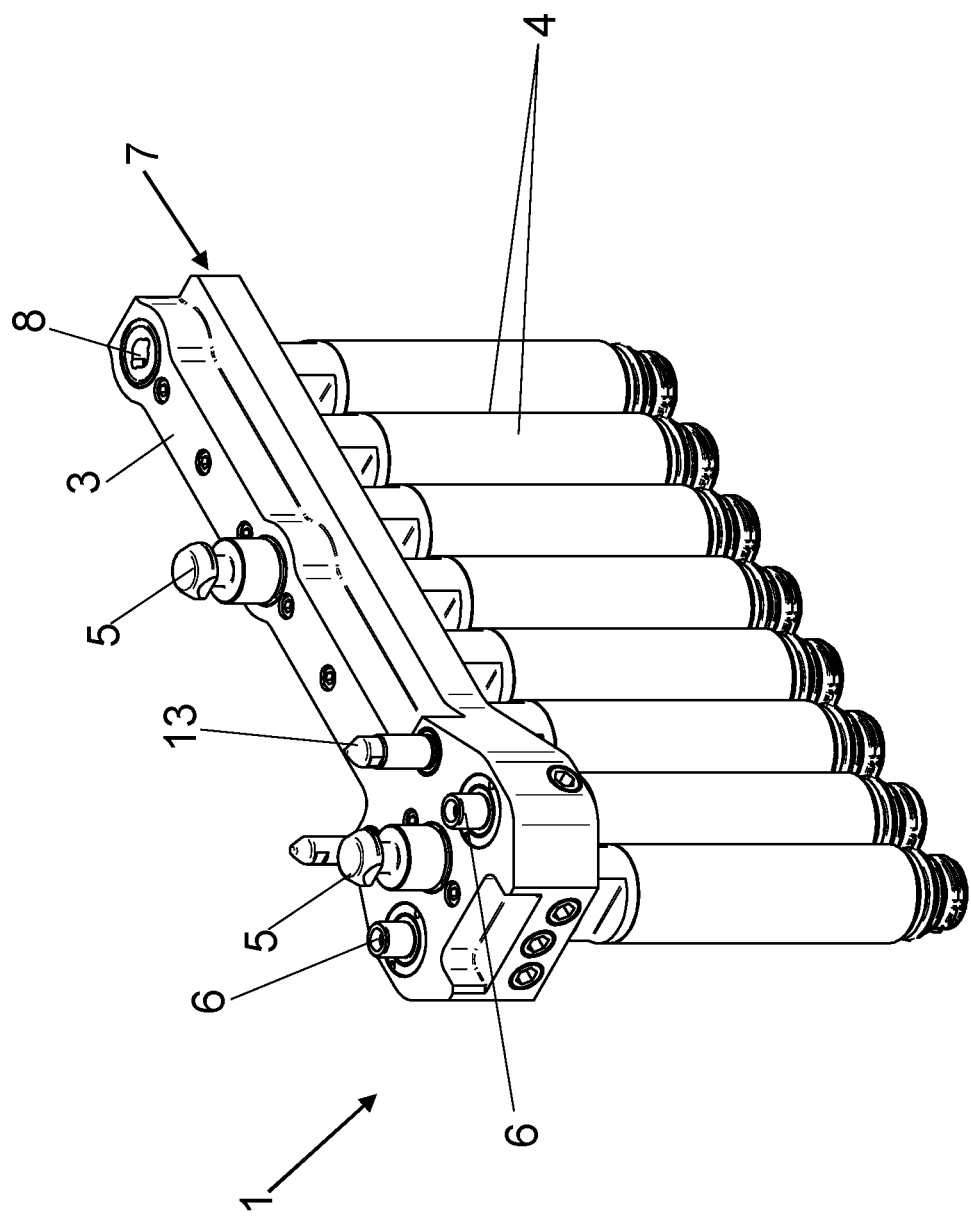
FIG. 1c depicts a further perspective view of one of the components in FIG. 1b.
Figure 2B:
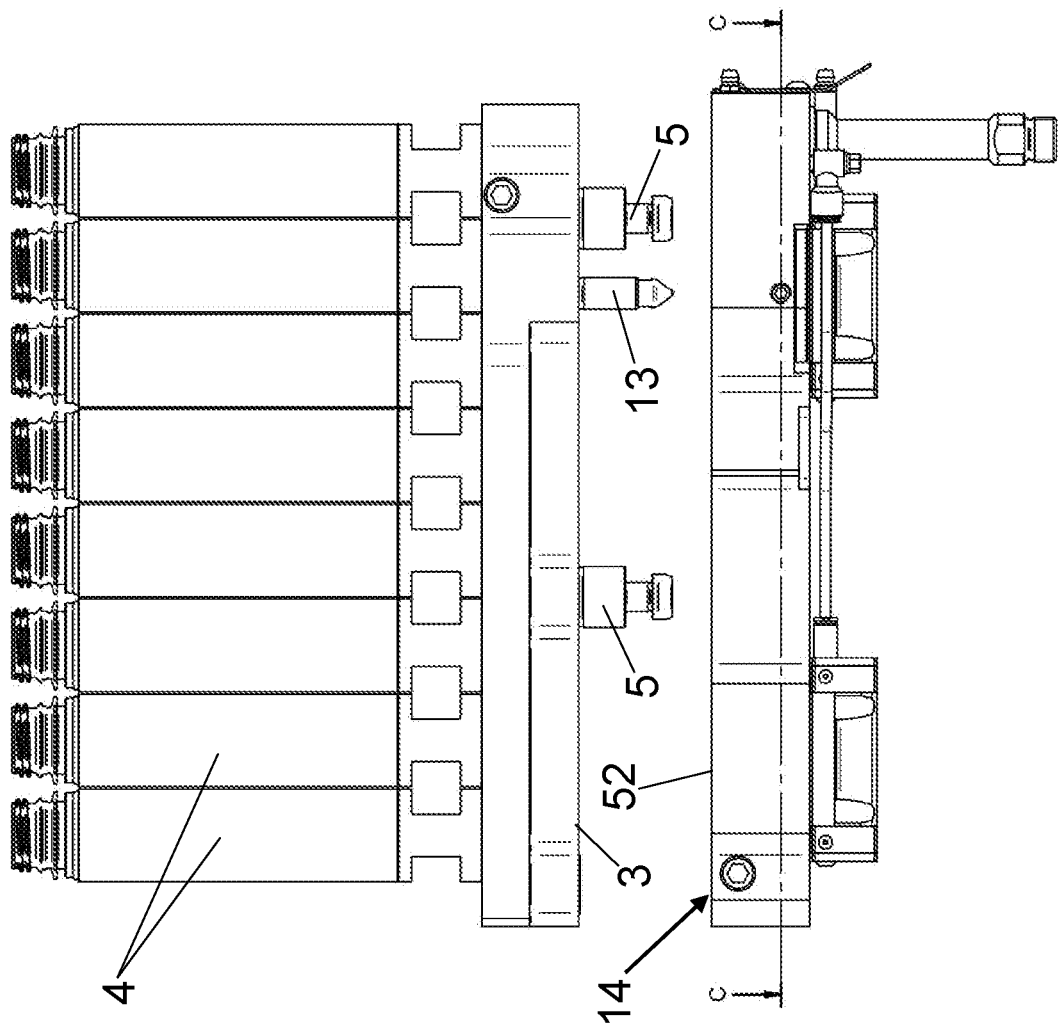
FIGS. 2a and 2b depict side views of the aforesaid components not coupled to one another.
Figure 2A:
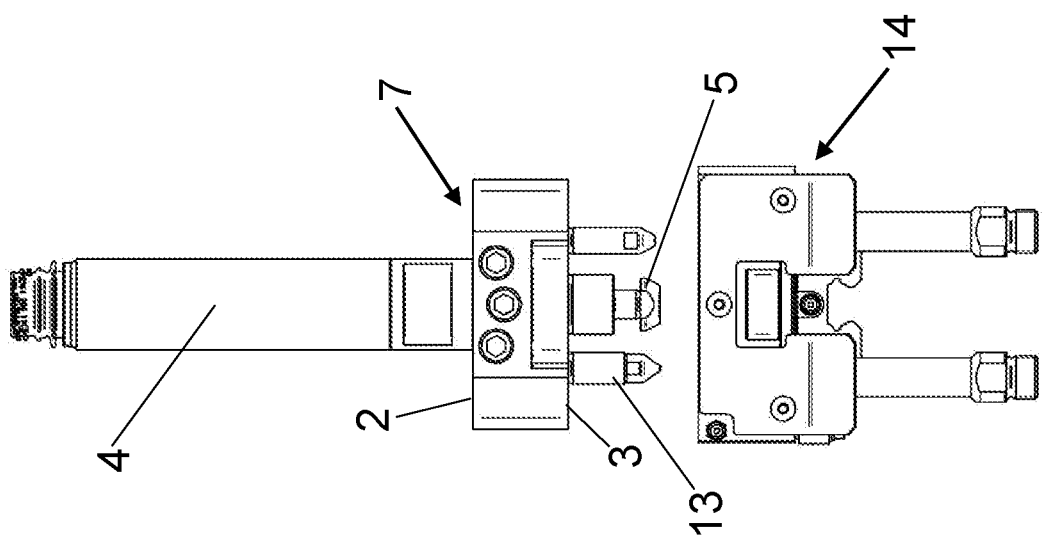
Figure 6B:
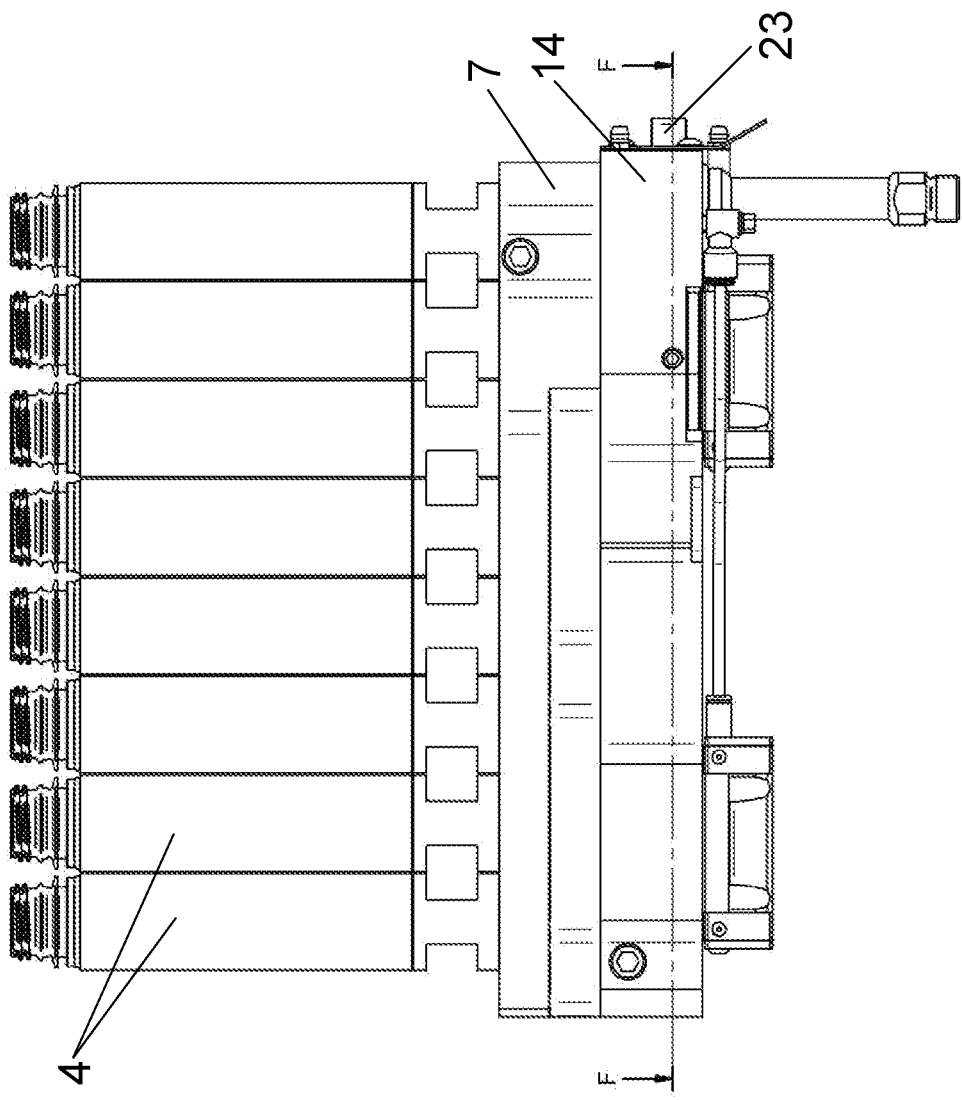
FIGS. 6a and 6b depict side views of the aforesaid components coupled to one another.
Figure 6A:
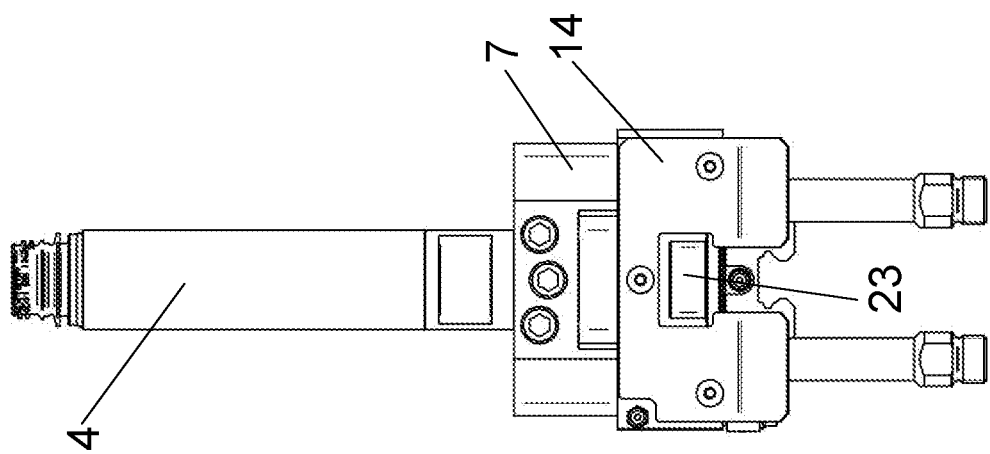

In the particular example in FIG. 1c, the first longitudinal support member 7 is provided with two male members 6 and a female member 8. Therefore, the second longitudinal support member 14 will be provided with two female members 6' and a male member 8'. In this case, there are provided in the support member 7 (FIGS. 4-5 and 8-9):
- two channels 11 for the cooling fluid, connected to a respective male member 6, one for the inlet of the cooling fluid into the support member 7 and the other for the outlet of the cooling fluid from said support member 7;
- and a channel 12 allowing the air, suctioned through the duct 10, to escape by means of the female member 8.

Therefore, in the cooling system 43 in this example, there are provided two fluid-tight connections 6, 6' for the cooling fluid and one fluid-tight connection 8, 8' for the air, for example two hydraulic connections and a pneumatic connection.

Alternatively, rather than suctioning air in order to facilitate the insertion of the preform into the cooling tube, the duct 10 can be used to blow air into the cooling tube. Hence, the at least one duct 12 of the support member 7 allows the introduction of air by means of the female member 8, said air being then blown through the duct 10.

Further optional channels (not shown) in the base 14 allow conveying water from the outer connections 53 to the female members 6' of the fluid-tight connections and vice versa.

Therefore, in this example, the hydraulic connection between the base 14 and the support member 7 of the tubes 4 is formed by a pair of push-fit, fluid-tight connections of the male-female type. FIG. 14 shows an example of a fluid-tight engagement connection, available on the market, which can be used in the present invention. The pneumatic connection is instead formed by a single engagement connection of the male-female type.

Advantageously, the cooling system 43 provides that the first longitudinal support member 7 of the cooling device 1 and the second longitudinal support member or base 14 be connectable and disconnectable to/from each other by a quick coupling system, which makes the use of external tools for assembling and disassembling the members forming the cooling system unnecessary.

Such a quick coupling system comprises the at least one first connection pin 5 of the cooling device 1, and preferably comprises, within the second longitudinal support member or base 14, in a first embodiment thereof (FIGS. 3 and 7),
- a first slider 23, defining a first longitudinal sliding direction, sliding along said first direction on a plane parallel to the longitudinal axis Y and able to take an unlocking position (FIG. 3) and a locking position (FIG. 7), the first slider 23 being provided with at least one hole or cavity 27 for locking the at least one first connection pin 5 therein when the first slider 23 is in the locking position,
- and a second slider 26 defining a second longitudinal sliding direction on said plane, intersecting said first sliding direction; the second slider 26 sliding along said second sliding direction from a first position of mechanical connection with the first slider 23 (FIG. 3), in which the first slider 23 is in the unlocking position, to a second position of release from said first slider 23 (FIG. 7), in which the first longitudinal support member 7 and the second longitudinal support member 14 are connected to each other by means of the at least one first connection pin 5 and the first slider 23 is in the locking position.

In this first embodiment, the assembly of the cooling device 1 on the second longitudinal support member 14 takes place by simply manually applying a force to the first longitudinal support member 7 from the top downwards. Following this force, the possible fluid-tight connections, which have commercial engagement couplings, are connected and the first slider 23 is triggered to pass from the locking position to the unlocking position.

Figure 7:
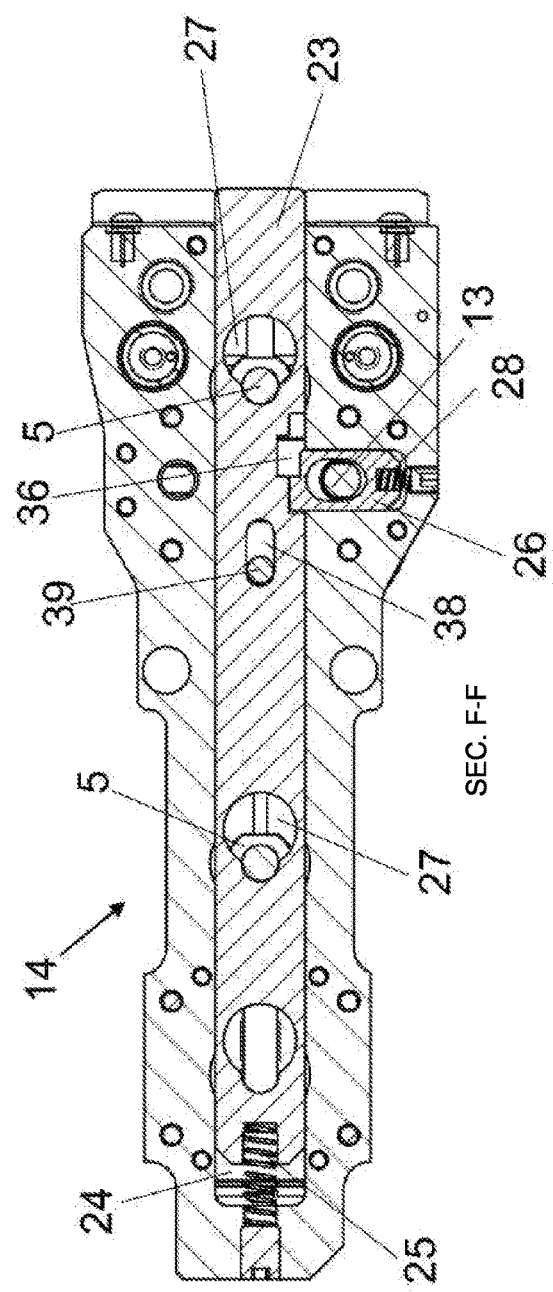
FIG. 7 depicts a sectional view of a component in FIG. 6b along the plane F-F.
Figure 6C:
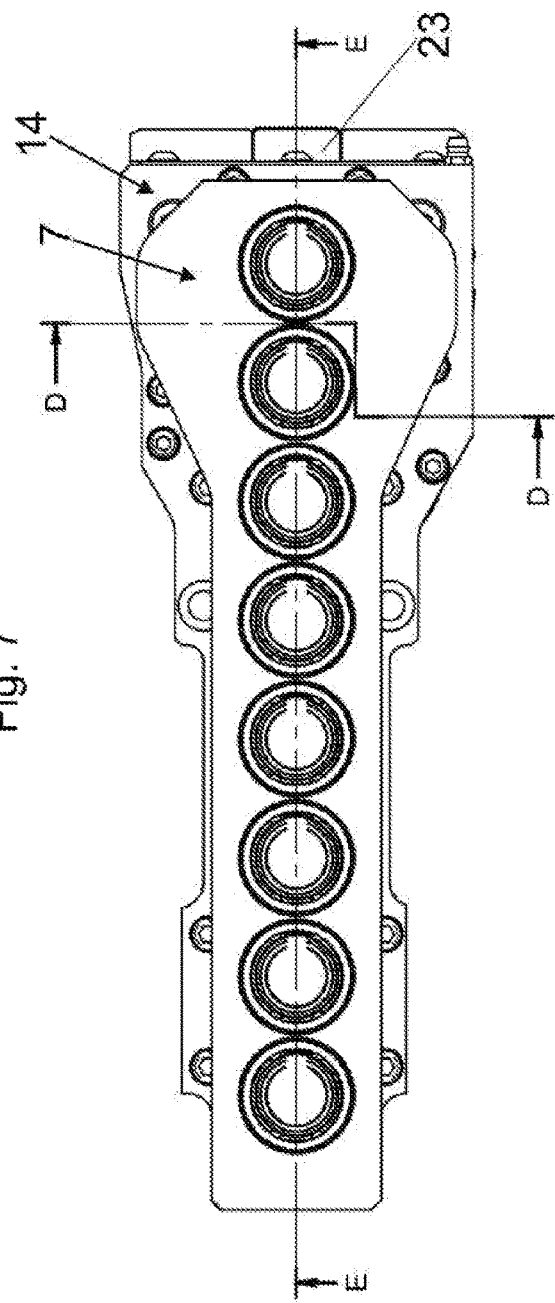
Figure 11:
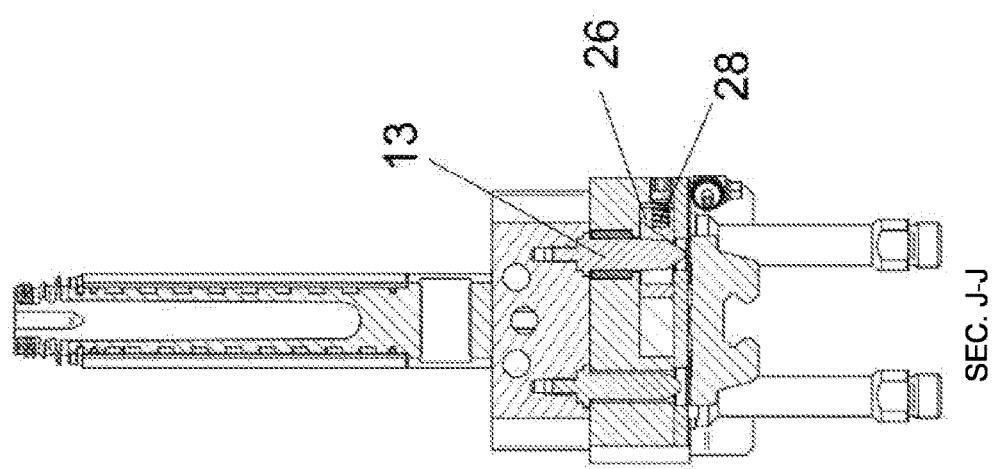
FIG. 11 depicts a sectional view of the components in FIG. 10 along the plane J-J.
Figure 10:
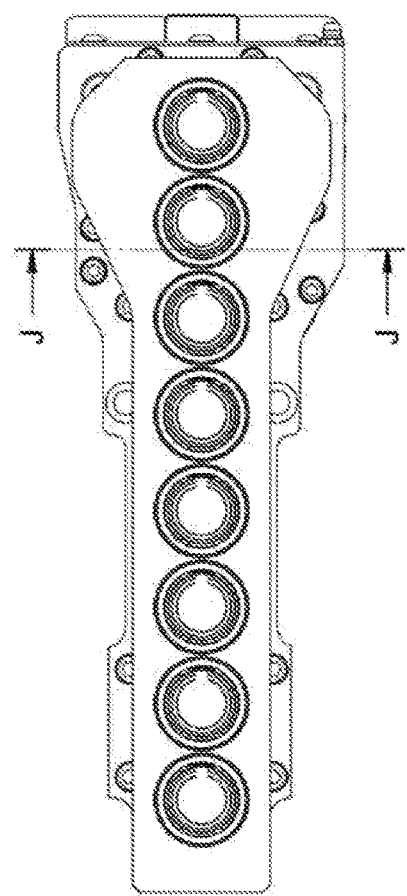

In a second embodiment shown in FIGS. 15a and 15b, corresponding to FIGS. 3 and 7 of the first embodiment, the quick coupling system comprises the at least one first connection pin 5 of the cooling device 1 and comprises, within the second longitudinal support member or base 14, only the slider 23 provided with at least one hole or cavity 27 for locking the at least one first connection pin 5 therein. Such a slider 23, defining a longitudinal sliding direction, can slide along said direction on a plane parallel to the longitudinal axis Y and is able to take an unlocking position (FIG. 15a), in which the support member 7 can be unlocked from the base 14, and a locking position (FIG. 15b), in which the at least one first connection pin 5 is locked inside the at least one hole or cavity 27.

In both embodiments, the disassembly of the cooling device 1 from the second longitudinal support member 14 takes place by simply manually pressing the first slider 23 towards the inside of the base 14, and the at least one connection pin is uncoupled, preferably also due to the force of the springs which distances the two parts, said springs being provided in the engagement couplings of the fluid-tight connections.

Preferably, the first longitudinal support member 7 is provided with at least two first connection pins 5, for example two first pins 5, and the first slider 23 is provided with respective holes 27 arranged along said first longitudinal sliding direction.

Preferably, each hole 27 is appropriately shaped to lock a respective first connection pin 5 when the first slider 23 passes from the unlocking position to the locking position.

In particular, the holes 27 have a slot-shaped profile for the quick and efficient mechanical coupling of the pins 5.

For example, in case of mushroom- or cap-shaped connection pins 5, the holes 27 of the first slider 23 have a first portion 52 having, in the plan view, a first profile and a second portion 53 having, in the plan view, a second profile which is narrower than the first profile (FIG. 12b). During the quick mechanical coupling step, the connection pins 5 cross the respective holes 27 at the portion 52 having a larger profile. After the sliding of the first slider 23 towards the outside of the second support member 14, the pins 5 will be locked with the second portion 51 thereof in the portion 53 of the holes 27 having a narrower profile.

Preferably, if the second slider 26 is also provided, the first longitudinal support member 7 is provided with at least one second connection pin 13, for example only one connection pin 13, adapted to interact with the second slider 26 bringing the latter from the first mechanical connection position to the second release position.

In the example of the Figures, the second connection pin 13 is a tapered pin and the second slider 26 is provided with a respective through hole 31 having an inner surface portion 32 inclined (FIGS. 13a, 13b, 13c) so that the tapered pin is engaged on said inner surface portion, during the step of connection between the first longitudinal support member 7 and the second longitudinal support member 14, thus generating the release of the second slider 26 from the first slider 23 (FIG. 7).

Preferably, in the variant with the two sliders 23 and 26, the second longitudinal support member or base 14 comprises:
- the first slider 23, arranged partially inside the base 14;
- a first internal longitudinal seat 24, defining said first sliding direction, in which the first slider 23 can slide;
- first elastic return means 25, fixed at a first end to a bottom of said first internal longitudinal seat 24 and at a second end to the first slider 23, for pushing the first slider towards a more external position thereof with respect to the base 14 (FIG. 9), corresponding to a locking position between the base 14 and the support member 7 (FIG. 7);
- a second slider 26, arranged completely inside the base 14;
- a second internal seat 29 (FIG. 3), defining said second sliding direction that is transverse, preferably orthogonal, to the first sliding direction, and in which the second slider 26 can slide;
- second elastic return means 28, fixed at a first end to a bottom of said second internal seat 29 and at a second end to the second slider 26, for pushing the second slider 26 towards said first position of mechanical connection with the first slider 23 (FIG. 3).

First and second elastic return means 25, 28 are, preferably but not necessarily, springs, for example helical springs. Other types of springs can, alternatively, be provided.

The first slider 23, shown in FIGS. 12a, 12b and 12c, is preferably provided with:
- a seat 34, provided at the end thereof that is internal to the base 14, for housing one end of the elastic return means 25;
- at least two transverse through holes 27, for example two or three, arranged along the longitudinal sliding direction of the first slider 23, appropriately shaped to lock the respective first connection pin 5 when the first slider 23 passes from the innermost position thereof with respect to the base 14 (FIG. 5), corresponding to an unlocking position in which the base 14 and the support member 7 are not connected to each other, to the outermost position (FIG. 9), corresponding to a locking position in which the base 14 and the support member 7 are connected to each other by the pins 5;
- a lateral recess 36 for housing a corresponding projection 37 of the second slider 26 and keeping the first slider 23 fixed in said more internal position thereof with respect to the base 14 (FIG. 3);
- a possible longitudinal slot 38, configured to house a possible abutment element 39 integral with the base 14, so as to delimit the stroke of the first slider 23.

Alternatively or additionally, the end-of-stroke abutment of the first slider 23 can be made between the projection 37 of the second slider 26 and a part of the lateral recess 36 shaped so as to house said projection 37 (FIG. 7).

If the second slider 26 is not provided, the slider 23 does not have the lateral recess 36.

The second slider 26, shown in FIGS. 13a, 13b and 13c, is preferably provided with:
- a seat 30, provided at the distal end thereof with respect to the first slider 23, for housing one end of the elastic return means 28;
- a through hole 31, arranged in a median area of the second slider 26, in which a portion of the inner surface 32 thereof is appropriately inclined so that the second connection pin 13 is engaged on said portion of inclined surface 32 during the step of connection between the support member 7 and the base 14, generating the release of the second slider 26 from the first slider 23 and compressing the elastic return means 28;
- the aforesaid projection 37, provided at the proximal end thereof with respect to the first slider 23, to perform the mechanical connection with the lateral recess 36 of the first slider 23 and keep the latter fixed in the innermost position thereof with respect to the manifold (FIG. 5).

The second longitudinal support member or base 14 is further provided with at least one through hole 5' for the passage of said at least one first connection pin 5 inside the first longitudinal internal seat 24, and possibly with a further through hole 13' for the passage of the second connection pin 13 inside the second internal seat 29 (FIGS. 4 and 5).

If only one first connection pin 5 is provided on the second longitudinal surface 3 of the support member 7 (variant not shown), and therefore only one through hole 5' is provided on the flat surface 52 of the base 14 and only one transverse through hole 27 is provided in the first slider 23, the second connection pin 13, preferably a conical pin, also acts as an anti-rotation device between the support member 7 and the base 14.

The second connection pin 13 can also be provided, projecting from the second longitudinal surface 3 of the first longitudinal support member 7, in the embodiment without the second slider 26. Also in this case, when only one first connection pin 5 is provided on the second longitudinal surface 3 of the support member 7 (variant not shown), and therefore only one through hole 5' is provided on the flat surface 52 of the base 14 and only one transverse through hole 27 is provided on the slider 23, the second connection pin 13, preferably a conical pin, is inserted into a corresponding hole or cavity of the base 14, arranged laterally with respect to the internal longitudinal seat 24 in which the slider 23 slides, and acts as an anti-rotation device between the support member 7 and the base 14.

With reference to FIGS. 2a to 14, only one embodiment exemplifying the cooling system 43 of the invention is shown.

The support member 7 is provided with the following components, projecting from the flat surface 3, useful for the mechanical or hydraulic or pneumatic connection between said support member 7 and the base 14:
- two first mechanical connection pins 5,
- one second mechanical connection pin 13,
- two male members 6 of respective fluid-tight engagement connections;
- one female member 8 of a further fluid-tight engagement connection.

The base 14 is provided, at a flat surface 52 thereof facing towards the flat surface 3 of the support member 7, with (FIGS. 4-5):
- two first through holes 5' for the passage of said first mechanical connection pins 5,
- one second through hole 13' for the passage of said second mechanical connection pin 13,
- two female members 6' of respective fluid-tight engagement connections, corresponding to the male members 6, one male member 8' of the further fluid-tight engagement connection, corresponding to the female member 8.

Below is a description of the implementation of the quick coupling operation of the support member 7, and therefore of the cooling device 1, to the base 14 of the cooling system 43. Said quick coupling operation includes the following stages:

- providing the first slider 23 locked in the innermost position thereof with respect to the base 14 (FIGS. 3 and 5), with the first elastic return means 25 compressed and the second elastic return means 28 stretched, which keep the projection 37 of the second slider 26 inserted into the lateral recess 36 of the first slider 23;
- lowering the support member 7 onto the base 14 so as to automatically engage the connection pins 5, the connection pin 13, the male members 6 of the hydraulic connections and the female member 8 of the pneumatic connection respectively in the holes 27 of the first slider 23, in the hole 31 of the second slider 26, in the female members 6' of the hydraulic connections and in the male member 8' of the pneumatic connection.

In particular, by lowering the support member 7 onto the base 14, the connection pin 13 is engaged on the portion of inclined surface 32 of the hole 31 in the second slider 26. The connection pin 13 thus pushes the second slider 26 towards the elastic return means 28, compressing them, releasing the projection 37 from the recess 36.

No longer being constrained to the second slider 26, the first slider 23 is displaced, due to the action of the elastic return means 25, towards the outside of the base 14 reaching the outermost position thereof (FIGS. 7 and 9), corresponding to a locking position in which the base 14 and support member 7 are connected to each other by means of the pins 5.

In fact, during the displacement of the first slider 23 from the innermost position to the outermost position thereof with respect to the base 14, the pins 5 are inserted into the slot-shaped profile of the holes 27 determining the mechanical coupling between the support member 7 and base 14.

The pins 5 are located in the locking position with the first slider 23 at the end of the vertical engagement movement of the support member 7 on the base 14 or manifold (FIGS. 7, 8 and 9). The stroke of the first slider 23 towards the outside of the base 14 is delimited by an abutment pin 39, integral with the structure of the base 14 and inserted into the longitudinal slot 38 provided in the first slider 23 between the two holes 27 (see FIGS. 5 and 9).

Advantageously, the portion of inclined surface 32 of the hole 31 allows releasing the first slider 23 with less force than the thrust force applied by the first elastic return means 25. The portion of inclined surface 32 has an inclination angle of about 20-30°, preferably 25°, with respect to the vertical advancement direction of the connection pin 13.

With the automatic positioning of the first slider 23 in the outermost configuration thereof the manual quick coupling operations of the support member 7 to the base 14 are concluded.

Advantageously, in order to perform the inverse operation of automatically uncoupling the support member 7, and thus the cooling device 1, from the base 14, it is sufficient:

- to push the first slider 23 manually towards the inside of the base 14 until locking said first slider in the innermost position thereof (FIGS. 3 and 5),
- and, at the same time, to manually facilitate the upwards movement of the support member 7.

During the release operation, by pressing the first slider 23 towards the inside of the base, the pins 5 tend to exit from the slot profile of the holes 27. At the same time, preferably the reaction springs 60 (FIG. 14), provided for example inside the connections, push the support member 7 upwards releasing the connection pin 13 from the portion of inclined surface 32 of the hole 31 and allowing the second slider 26, due to the action of the elastic return means 28, to be engaged on the first slider 23 locking the latter in the retracted position thereof (FIGS. 3 and 5). At this point, the elastic return means 25 are compressed and the elastic return means 28 are stretched, keeping the projection 37 of the second slider 26 inserted into the lateral recess 36 of the first slider 23.

Advantageously, the hydraulic, pneumatic and mechanical coupling and uncoupling operations, between the parts, take place by means of a single respective manual operation. In fact, the solution of the invention allows engaging the connections by means of a single manual movement of the cooling device 1 while automatically achieving the mechanical lock between the support member 7 and the support member or base 14.

Furthermore, the solution of the invention allows releasing the connections with a single manual movement of the first slider while mechanically uncoupling the cooling device 1 from the base 14. All this obviously implies quicker and more efficient operations when changing the format of the cooling tubes according to the preforms or test tubes to be cooled.

The implementation of the operation of quickly coupling the support member 7, and thus the cooling device 1, to the base 14 of the cooling system 43 is described below for the case in which the second slider 26 is not provided. Said quick coupling operation includes the following stages:

- providing the single slider 23 in the outermost position thereof, with respect to the base 14, maintained by the stretching of the elastic return means 25;
- manually pressing the slider 23 towards the inside of the base 14 until the innermost position thereof (see the arrow in FIG. 15*a*), and keeping the slider 23 pressed in said innermost position maintaining the elastic return means 25 compressed;
- lowering the support member 7 onto the base 14 so as to engage the connection pins 5, the male members 6 of the hydraulic connections and the female member 8 of the pneumatic connection respectively in the holes 27 of the slider 23, in the female members 6' of the hydraulic connections and in the male member 8' of the pneumatic connection;
- releasing the manual pressure on the slider 23 by letting said slider 23 move due to the action of the elastic return means 25 towards the outside of the base 14 reaching the outermost position thereof (FIG. 15*b*), corresponding to a locking position in which the base 14 and support member 7 are connected to each other by means of the pins 5; in fact, during the displacement of the slider 23 from the innermost position to the outermost position thereof with respect to the base 14, the pins 5 are inserted into the slot-shaped profile of the holes 27 determining the mechanical coupling between the support member 7 and base 14.

The stroke of the slider 23 towards the outside of the base 14 is delimited by an abutment pin 39, integral with the structure of the base 14, inserted into the longitudinal slot 38 provided in the slider 23 between the two holes 27.

Advantageously, in order to perform the inverse operation of automatically uncoupling the support member 7, and thus the cooling device 1, from the base 14, it is sufficient:

- to manually press the slider 23 towards the inside of the base 14 until the innermost position thereof, and keep the slider 23 pressed in said innermost position by compressing the elastic return means 25;
- to manually facilitate the upwards movement of the support member 7 by disengaging the male and female members of the connections and pulling the pins 5 out of the holes 27;
- to release the manual pressure on the slider 23 letting said slider 23 move due to the action of the elastic return means 25 towards the outside of the base 14 reaching the outermost position thereof.

During the release operation, by pressing the slider 23 towards the inside of the base, the pins 5 tend to exit from the slot profile of the holes 27. At the same time, preferably, the reaction springs 60 (FIG. 14), provided for example inside the connections, also push the support member 7 upwards.

An advantage of both embodiments, with or without the second slider 26, is that of reducing the force required for the coupling between the two parts of the cooling system 43. In fact, in the engagement step, the force required to insert the first connection pins 5 into the first slider 23 is practically zero, whereas the force required for the coupling of the male-female members of the hydraulic and pneumatic connections remains unvaried, to which the force for inserting the connection pin 13 inside the second slider 26 is possibly added.

The invention claimed is:

1. A cooling device for cooling a plurality of preforms or tubular containers, the device comprising
    a first longitudinal support member defining a longitudinal axis Y and having a first longitudinal surface and a second longitudinal surface opposite to the first longitudinal surface;
    a plurality of cooling tubes, each adapted to receive a respective preform to be cooled, said cooling tubes being arranged on said first longitudinal surface in sequence in a row along the longitudinal axis Y and each cooling tube defining a perpendicular axis thereof with respect to said longitudinal axis Y;
    at least one first connection pin protruding from said second longitudinal surface for a quick coupling to a second longitudinal support member, adapted to be arranged on a rotary cooling apparatus.

2. A device according to claim 1, wherein the cooling tubes are arranged in a single row, each adjacent to the next one, along said longitudinal axis Y.

3. A device according to claim 1, wherein on the second longitudinal surface there are provided
    at least one first male or female fluid-tight connection member, adapted to be coupled to a corresponding first female or male member engaged in said second longitudinal support member, for a passage of a cooling fluid from said second longitudinal support member to said first longitudinal support member;
    at least one second male or female fluid-tight connection member, adapted to be coupled to a corresponding second female or male member engaged in said second longitudinal support member, for a passage of air from said first longitudinal support member to said second longitudinal support member.

4. A device according to claim 3, wherein each cooling tube is provided with an internal circuit for the cooling fluid and with an air suction duct to facilitate an introduction of the preform into the cooling tube,
    and wherein said first longitudinal support member is provided with at least one channel for the cooling fluid connected on one side to said at least one first male or female member and on another side to the internal circuit of each cooling tube, and provided with at least one further channel for the air connected on one side to said at least one second male or female member and on another side to the air suction duct of each cooling tube.

5. A device according to claim 1, wherein at least one second connection pin is provided, protruding from said second longitudinal surface for a quick coupling to said second longitudinal support member.

6. A device according to claim 1, wherein said at least one first connection pin has an end provided with a first portion, having a first diameter, which is proximal to said second longitudinal surface, and with a second portion, which is distal from said second longitudinal surface and having a second diameter which is larger than the first diameter.

7. A cooling system for cooling a plurality of preforms or tubular containers, the system comprising
    a cooling device according to claim 1,
    and a second longitudinal support member arranged along said longitudinal axis Y,
    wherein said first longitudinal support member and said second longitudinal support member are connectable to each other by a quick coupling system,
    wherein said quick coupling system comprises said at least one first connection pin, and comprises, inside said second longitudinal support member, a first slider provided with at least one hole or cavity for locking said at least one first connection pin therein, wherein said first slider, defining a first longitudinal sliding direction, is able to slide along said first longitudinal sliding direction on a plane parallel to said longitudinal axis Y and is able to take an unlocking position, in which it is possible to unlock the first longitudinal support member from the second longitudinal support member, and a locking position, in which the at least one first connection pin is locked inside the at least one hole or cavity.

8. A system according to claim 7, wherein said quick coupling system also comprises, inside said second longitudinal support member, a second slider defining a second longitudinal sliding direction on said plane, intersecting said first longitudinal sliding direction; said second slider being slidable along said second longitudinal sliding direction from a first position of mechanical connection with the first slider, in which the first slider is in the unlocking position, to a second position of release from said first slider, in which the first slider is in the locking position.

9. A system according to claim 8, wherein the first longitudinal support member is provided with at least one second connection pin, adapted to interact with the second slider bringing this latter from said first position of mechanical connection to said second release position.

10. A system according to claim 9, wherein in the second longitudinal support member there are provided:
    a first internal longitudinal seat in which the first slider can slide,
    first elastic return device, fixed at a first end to a bottom of said first internal longitudinal seat and at a second end to the first slider, for pushing the first slider towards said locking position,
    a second internal seat in which the second slider can slide, second elastic return device, fixed at a first end to a bottom of said second internal seat and at a second end to the second slider, for pushing the second slider towards said first position of mechanical connection.

11. A system according to claim 10, wherein at least one first through hole is provided on the second longitudinal support member for the passage of said at least one first connection pin inside the first internal longitudinal seat.

12. A system according to claim 11, wherein a second through hole is provided on the second longitudinal support member for a passage of said second connection pin inside the second internal seat.

13. A system according to claim 9, wherein said at least one second connection pin is a tapered pin and said second slider is provided with a respective through hole having an inner surface portion inclined so that the tapered pin is engaged on said inner surface portion, during the connection between the first longitudinal support member and the second longitudinal support member, thus generating a release of the second slider from the first slider.

14. A system according to claim 7, wherein the first longitudinal support member is provided with at least two first connection pins and the first slider is provided with at least two holes arranged along said first longitudinal sliding direction, each hole being appropriately shaped to lock a respective first connection pin when said first slider moves from the unlocking position to the locking position.

15. A system according to claim 14, wherein said at least two first connection pins have an end provided with a first portion having a first diameter and a second portion having a second diameter which is larger than the first diameter, and the respective holes of the first slider have an eyelet-shaped profile to hook said first connection pins.

16. A system according to claim 7, wherein at least one quick-coupling, fluid-tight connection is provided between the first longitudinal support member and the second longitudinal support member for a passage of a cooling fluid from the second longitudinal support member to the first longitudinal support member, or vice versa.

17. A system according to claim 7, wherein at least one quick-coupling, fluid-tight connection is provided between the first longitudinal support member and the second longitudinal support member for a passage of air from the first longitudinal support member to the second longitudinal support member, or vice versa.

18. A rotary cooling apparatus for cooling preforms or tubular containers made of thermoplastic material, comprising:
- a carousel having a periphery thereof and adapted to rotate about a vertical rotation axis X;
- at least one fixed guide element arranged along at least part of said periphery;
- a plurality of cooling systems according to claim 7, arranged radially along the periphery of the carousel, each cooling system being adapted to translate horizontally along a radial direction with respect to said rotation axis X and provided with a plurality of cooling tubes arranged in sequence in a row along said radial direction and each adapted to receive a respective preform to be cooled;
- a plurality of picking and releasing devices, each picking and releasing device cooperating with a respective cooling system and being adapted to pick a preform from a transfer wheel, release said preform alternately into one of said cooling tubes and pick said preform again to release it downstream of said rotary cooling apparatus, said at least one picking and releasing device being adapted to translate upwards or downwards transversally to said radial direction by cooperating with said at least one fixed guide element, during a rotation of the carousel.

19. An apparatus according to claim 18, wherein at least one cooling system and at least one corresponding picking and releasing device define a cooling module of said rotary cooling apparatus.

20. A cooling device, according to claim 1, for cooling a plurality of preforms or tubular containers exiting from a rotary or linear injection molding apparatus.

* * * * *